United States Patent
Krumm et al.

(10) Patent No.: US 9,512,338 B2
(45) Date of Patent: Dec. 6, 2016

(54) METHOD FOR MANUFACTURING AN ADHESIVE COMPOUND FOR USE IN THE PRODUCTION OF CORRUGATED PAPERBOARD

(71) Applicant: Greif Packaging LLC, Delaware, OH (US)

(72) Inventors: Christopher A. Krumm, Akron, OH (US); Dale Kiaski, Massillon, OH (US); Paul Light, Wadsworth, OH (US)

(73) Assignee: Greif Packaging LLC, Delaware, OH (US)

(*) Notice: Subject to any disclaimer, the term of this patent is extended or adjusted under 35 U.S.C. 154(b) by 74 days.

(21) Appl. No.: 14/264,528

(22) Filed: Apr. 29, 2014

(65) Prior Publication Data

US 2015/0307755 A1 Oct. 29, 2015

(51) Int. Cl.
*C09J 103/02* (2006.01)
*B31F 1/28* (2006.01)
*C08K 3/38* (2006.01)
*C08K 3/28* (2006.01)

(52) U.S. Cl.
CPC ............ *C09J 103/02* (2013.01); *B31F 1/2818* (2013.01); *C08K 3/38* (2013.01); *C08K 2003/287* (2013.01)

(58) Field of Classification Search
CPC ......... C09J 103/02; B31F 1/2818; C08K 3/38; C08K 2003/387
See application file for complete search history.

(56) References Cited

U.S. PATENT DOCUMENTS

| | | | |
|---|---|---|---|
| 4,469,043 A | 9/1984 | Kohler et al. |
| 4,513,915 A | 4/1985 | Kohler et al. |
| 4,697,542 A | 10/1987 | Kohler et al. |
| 4,863,087 A | 9/1989 | Kohler |
| 5,242,498 A | 9/1993 | Kohler et al. |
| 5,378,503 A | 1/1995 | Kohler et al. |
| 5,383,622 A | 1/1995 | Kohler |
| 5,475,080 A | 12/1995 | Gruber et al. |
| 5,852,166 A | 12/1998 | Gruber et al. |
| 6,068,701 A | 5/2000 | Kohler et al. |
| 6,197,380 B1 | 3/2001 | Gruber et al. |

(Continued)

FOREIGN PATENT DOCUMENTS

WO 2011/160049 12/2011

OTHER PUBLICATIONS

Harper/Love Adhesives Corporation, Advanced Adhesives Report, Rheology vs. Viscosity, May 2010, 4 pages, Charlotte, NC, http://www.harperlove.com/Files/Documents/NewsMay10.pdf.

(Continued)

*Primary Examiner* — Alexander Polyansky
(74) *Attorney, Agent, or Firm* — Sand & Sebolt

(57) ABSTRACT

A method of manufacturing an adhesive composition for use in the production of paperboard is provided. An amount of water contained within a source container is provided. The water is heated to a first temperature. A rheology modifier is added to the heated water to create a heated solution. A starch is added to the heated solution. The heated solution is mixed for a first period of time to create a heated mixture. Additionally, there may be more independent time segments determining an amount of time which the components of the heated solution are mixed or blended together. Additional elements of the adhesive composition are added to the heated mixture between each mixing time segment.

18 Claims, 11 Drawing Sheets

(56) References Cited

U.S. PATENT DOCUMENTS

| | | |
|---|---|---|
| 6,451,170 B1 | 9/2002 | Anderson et al. |
| 6,524,440 B2 | 2/2003 | Anderson et al. |
| 6,602,546 B1 | 8/2003 | Kohler |
| 7,114,675 B1 | 10/2006 | Kohler |
| 7,267,153 B2 | 9/2007 | Kohler |
| 7,595,086 B2 | 9/2009 | Kohler |
| 7,674,354 B2 | 3/2010 | Berckmans et al. |
| 7,717,148 B2 | 5/2010 | Kohler |
| 8,038,787 B2 | 10/2011 | Christian et al. |
| 8,057,621 B2 | 11/2011 | Kohler |
| 8,076,473 B2 | 12/2011 | Berckmans et al. |
| 8,192,845 B2 | 6/2012 | Satyavolu et al. |
| 8,211,236 B2 | 7/2012 | Satyavolu et al. |
| 8,357,766 B2 | 1/2013 | Fricker et al. |
| 8,398,802 B2 | 3/2013 | Kohler |
| 8,672,825 B2 | 3/2014 | Kohler |
| 2005/0194088 A1 | 9/2005 | Kohler |
| 2005/0194103 A1 | 9/2005 | Kohler |
| 2006/0225830 A1 | 10/2006 | Kohler |
| 2007/0098887 A1 | 5/2007 | Kohler |
| 2008/0317940 A1 | 12/2008 | Kohler |
| 2009/0214754 A1 | 8/2009 | Satyavolu et al. |
| 2010/0181015 A1 | 7/2010 | Kohler |
| 2010/0331160 A1 | 12/2010 | Kohler |
| 2011/0011522 A1 | 1/2011 | Kohler |
| 2011/0100256 A1 | 5/2011 | Anderson et al. |
| 2013/0040158 A1 | 2/2013 | Marakainen et al. |
| 2013/0096239 A1 | 4/2013 | Biltresse et al. |
| 2013/0248088 A1 | 9/2013 | Andriessen et al. |

OTHER PUBLICATIONS

Corrugated Chemicals, Performance Enhancers; Penetrating Agents for High Performance Liners and Recycled Mediums, Bond-Aid and Bond-Aid Plus, 1 pages, Knoxville, TN, http://www.corrugatedchemicals.com/pdf/penetrants.pdf.

Corrugated Chemicals, Biocides; B-141, Proxel GXL, and KK-909, 1 page, Knoxville, TN, http://www.corrugatedchemicals.com/pdf/biocides.pdf.

Corrugated Chemicals, Defoamer, No-Foam 211, Defoamer for Starch & Flexo Inks, 1 page, Knoxville, TN, http://www.corrugatedchemicals.com/pdf/nofoam.pdf.

|  | STEP | Formula 3 SF VALUE | Formula 3 SF WEIGHT | Formula 4 DB VALUE | Formula 4 DB WEIGHT | UNIT OF MEASURE | MIX TIME (min) |
|---|---|---|---|---|---|---|---|
| 1102 | Water | 110 | 916 | 110 | 916 | gallons | |
| 1115 | Heat To | 112 | N/A | 111 | N/A | degrees | |
| 1104 | Additive | 1125 / 46 | 962 | 1125 / 46 | 962 | lbs | |
| 1106 | Pearl Starch | 107 | 1069 | 91 | 1053 | lbs | |
| 1108 | Caustic | 23.5 | 1093 | 29.3 | 1083 | lbs | 3 — 1101 |
| 1110 | Primary Borax | 4 | 1097 | 7 | 1090 | lbs | 2 — 1103 |
| 1111 | Water | 158 | 2409 | 160 | 2415 | gallons | |
| 1113 | Heat To | 94 | N/A | 94 | N/A | F | |
| 1118 | Flush Water | 1127 / 25 | 2434 | 1127 / 25 | 2440 | lbs | |
| 1120 | Secondary Borax | 2.5 | 2436 | 7 | 2447 | lbs | |
| 1122 | Pearl Starch | 520 | 2954 | 581 | 3021 | lbs | 1 — 1105 |
| 1112 | B-141 | 3 | 5oz. per plant | 3 | 5oz. per plant | lbs | |
| 1114 | No-Foam 211 | 3 | (temp. 6-7) | 3 | | oz. | |
| 1116 | Bond-Aid Plus | 17 | | 17 | | oz. | 1 — 1107 |
| 1117 | Final Mix Time | | | | | | 2 — 1109 |

QUALITY SPECS

| | | |
|---|---|---|
| Gel Temp | 143-145 | 139-141 |
| Viscosity | 23 +/-3 Love Cup | 23 +/-3 Love Cup |
| Solids | 21.7% | 22.8% |
| Batch Size | 327 | 333 |
| Dry lbs per Gallon | 1.92 | 2.02 |

FIG-11

METHOD FOR MANUFACTURING AN ADHESIVE COMPOUND FOR USE IN THE PRODUCTION OF CORRUGATED PAPERBOARD

BACKGROUND OF THE INVENTION

Technical Field

The present invention relates generally to adhesive used in the manufacture of corrugated paperboard. More particularly, the present invention relates to the method of manufacturing the adhesive used in the fabrication of corrugated paperboard. Specifically, the present invention provides a method of mixing a set of mixtures and solutions in a series of distinct and non-continuous time segments to create an adhesive composition for use in attaching at least one liner material to a corrugated medium material.

Background Information

Corrugated paperboard is produced when a sheet of medium material, usually a strong paper made largely of bleached or unbleached sulfate pulp, is corrugated by passing through a corrugating machine. Upon leaving the corrugating machine, the corrugated medium material has a series of flutes formed in a sinusoidal shape when viewed from the side. Adhesive is applied to the crests or apexes of the flutes by a glue applicator roll. Then, a first liner is attached to the corrugated medium atop the adhesive. Thereafter, a second adhesive applicator applies additional adhesive to the flutes spaced opposite the first set of flutes. Then, a second liner is connected to the second set of flutes to create a double-faced sheet of paperboard.

In most corrugating operations, the corrugating rolls used to corrugate and shape the medium material are at a temperature of approximately 300° F. This heat transfers to the medium material as it extends through the corrugating machine which helps cure the adhesive. The adhesive most often used in paperboard manufacture is often a starch-based adhesive that requires heat and pressure as part of the chemical reaction to gelatinize the starch into a film. Then water must be removed from the adhesive, often by the application of more heat, in order to fully cure the adhesive.

One problem that occurs is that most methods of available to heat paper to its desired temperature for bonding on the corrugator simultaneously remove water as the paper is being heated. One way to combat the resulting water removal is to use an infusion or pre-wetting system such as one that tries to inject steam under the web through the surface of the heating device to reduce this moisture loss. This device is very speed dependent and difficult to control. Additionally, since the typical corrugator continually changes speeds in a matter of seconds, and the current methods of heating paper sometimes respond in minutes, it becomes difficult to achieve specific temperature and moisture content independently of one another.

The flatness or dimensional stability of a finished paperboard product is often dependent on the moisture balance between the two outside liners that are bonded to the inner corrugated medium paper web. After the three pieces are combined into a sheet of paperboard, the individual sheets of paper often lose or gain moisture to or from one another and the surrounding atmosphere until an equilibrium condition is reached. In order to achieve optimum flatness, the individual sheets of paper should gain or lose as little moisture as possible during the process and should be as close to their equilibrium moisture as possible upon exiting the corrugating machine. This way, post-warp may be minimized.

Many manufacturers of paperboard have improvised types of improvements and have gained patents on new and unique ways to prevent paperboard warping during manufacture. Namely, U.S. Pat. No. 8,398,802 issued to Kohler discloses a method of adjusting the moisture content in a traveling web of medium material so that the web of medium material comprises a 6-9% weight percentage by moisture prior to corrugating. Then that web of medium material is heated to nearly 100° C. Then the material is corrugated such that the web of medium material retains the 6-9% weight percentage moisture through the corrugating steps. Kohler discloses that this method reduces warping and prevents an evenly applied cured adhesive.

Further, additional suppliers have sought patent protection on improved adhesive formulas. Name, PCT Application WO 2011/160049 assigned to Cargill Incorporated discloses an improved adhesive composition that contains a reduced amount of solids. The adhesive composition of the '049 Application includes the following components: a starch, a borate, an alkaline hydroxide, and a rheology modifier. To make the adhesive composition, the '049 Application requires that the components are all added together at one time into an amount of heated water in the range of 50° C.-59° C. (122° F.-138.2° F.), the solution is quenched with water, then reheated to a temperature in the range of 32° C.-44° C. (89.6° F.-111.2° F.), then the solution is mixed continuously for eight minutes to create an adhesive composition. The '049 Application further discloses using nearly 50% less adhesive than ordinarily used in a paperboard manufacturing process. However, in order to do so, the '049 Application requires that the liner temperatures are controlled and constrained in a range of 70-90° C.

From an academic standpoint, the '049 Application reduces the amount of solids within the adhesive in the paperboard manufacturing process. However, it is has been realized that real world applications do not often yield expected results and raise additional issues propagating manufacturing concerns that must be addressed. The present invention addresses these and other issues to cure the concerns.

SUMMARY

In accordance with one embodiment, the present invention may provide a method of manufacturing an adhesive compound, the method comprising the steps of: providing an amount of water contained within a source container; heating the water to a first temperature; adding a rheology modifier to the heated water to create a heated solution; adding a starch to the heated solution; mixing the heated solution for a first period of time to create a heated mixture.

Another embodiment of the present invention may provide a method of manufacturing an adhesive composition for use in the production of paperboard is provided. An amount of water contained within a source container is provided. Then, the water is heated to a first temperature. Next, a rheology modifier is added to the heated water to create a heated solution. Then, a starch is added to the heated solution. Then, the heated solution is mixed for a first period of time to create a heated mixture. Additionally, there are four more independent time segments determining an amount of time which the components of the heated solution are mixed or blended together. Additional elements of the adhesive composition are added to the heated mixture between each mixing time segment.

Yet another embodiment of the present invention provides an adhesive compound comprising: a starch, a biocide, a defoamer; and a penetrating agent. The biocide is from about 0.05 to about 0.15% solids by weight (% wt. solids) of the adhesive compound. The defoamer mass is about 6% of the mass of the biocide. The penetrating agent mass is about 35% of the mass of the biocide.

BRIEF DESCRIPTION OF THE SEVERAL VIEWS OF THE DRAWINGS

A sample embodiment of the invention, illustrative of the best mode in which Applicant contemplates applying the principles, is set forth in the following description, is shown in the drawings and is particularly and distinctly pointed out and set forth in the appended claims.

The accompanying drawings, which are incorporated in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 11 is a schematic view of an adhesive composed of the ingredients and the method of mixing the ingredients together.

Similar numbers refer to similar parts throughout the drawings.

DETAILED DESCRIPTION

Figure 1:
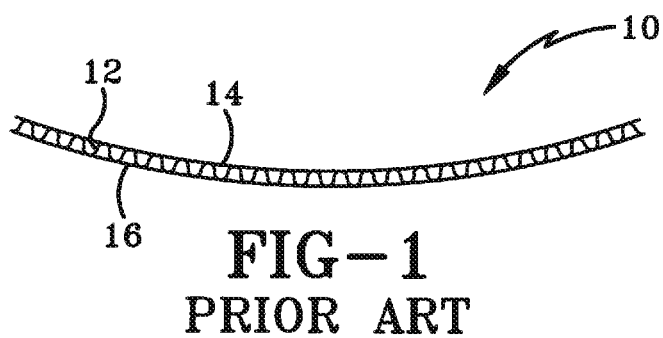
FIG. 1 is a side view of a PRIOR ART sheet of manufactured paperboard having the undesirable result of warping.

As known in the Prior Art and shown in FIG. 1 (PRIOR ART), a prior art sheet 10 of manufactured paperboard includes a corrugated medium material 12 juxtaposed between a first or top liner 14 and a second or bottom liner 16. During manufacture of prior art paperboard 10, the two outside liners 14, 16 are bonded to arcuate flutes defining the sinusoidally shaped corrugated paper web material 12. After combination into laminate sheets of paperboard 10, the individual sheets, 12, 14, and 16, lose or gain moisture to or from each other and the surrounding atmosphere until an equilibrium condition is reached. Warping occurs when the respective sheets 12, 14, 16 lose moisture at different evaporation rates. This causes paperboard 10 to warp or bow in a manner that reduces the flatness of paperboard 10. As shown in the prior art FIG. 1, when evaporation rates between the three liners are not equal, paperboard 10 can bow upwards forming a concave surface when viewed from the side. Warping is an undesirable result of the paperboard 10 manufacturing process.

Figure 2:
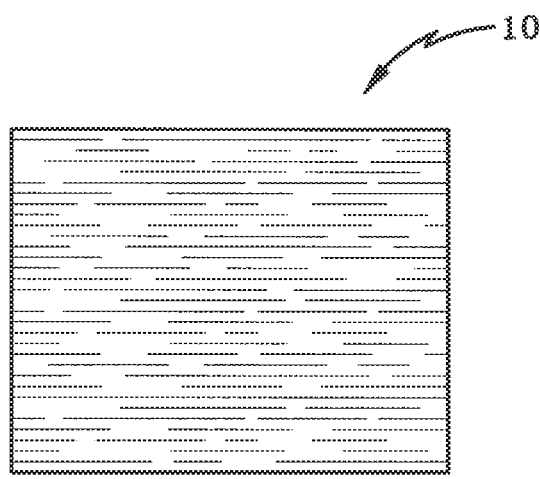
FIG. 2 is a top view of a PRIOR ART sheet of manufactured paperboard having the undesirable result of delamination.

As known in the Prior Art and shown in FIG. 2 (PRIOR ART), the prior art paperboard 10 may also have delamination problems caused by unbonded adhesive. Delamination occurs when adhesive is either non-evenly applied to the flutes of the corrugated sheet 14, or when the adhesive does not cure properly. The delamination leaves streaks across paperboard 10. The streaks represent sections of paperboard 10 that either liner 14 or liner 16 is unbonded to corrugated medium 12. The non-bonded portions greatly reduce the strength and structural rigidity of paperboard 10. Delamination is an undesirable result of the paperboard 10 manufacturing process.

The problems often arising in the prior art, as shown in FIGS. 1 and 2, are reduced by the present invention detailed in FIGS. 3-10. In accordance with an aspect of the present invention shown in FIGS. 3-10, the present invention shown generally as 1000 (FIG. 3) provides a system and a method for moisture and temperature control in the corrugation of paperboard that reduces warping and delamination problems ordinarily associated with the prior art. In accordance with another aspect of the present invention 1000, system provides a method of manufacturing paperboard having the desirable result of being planar or flat with an evenly cured and strong adhesive.

Figure 3:
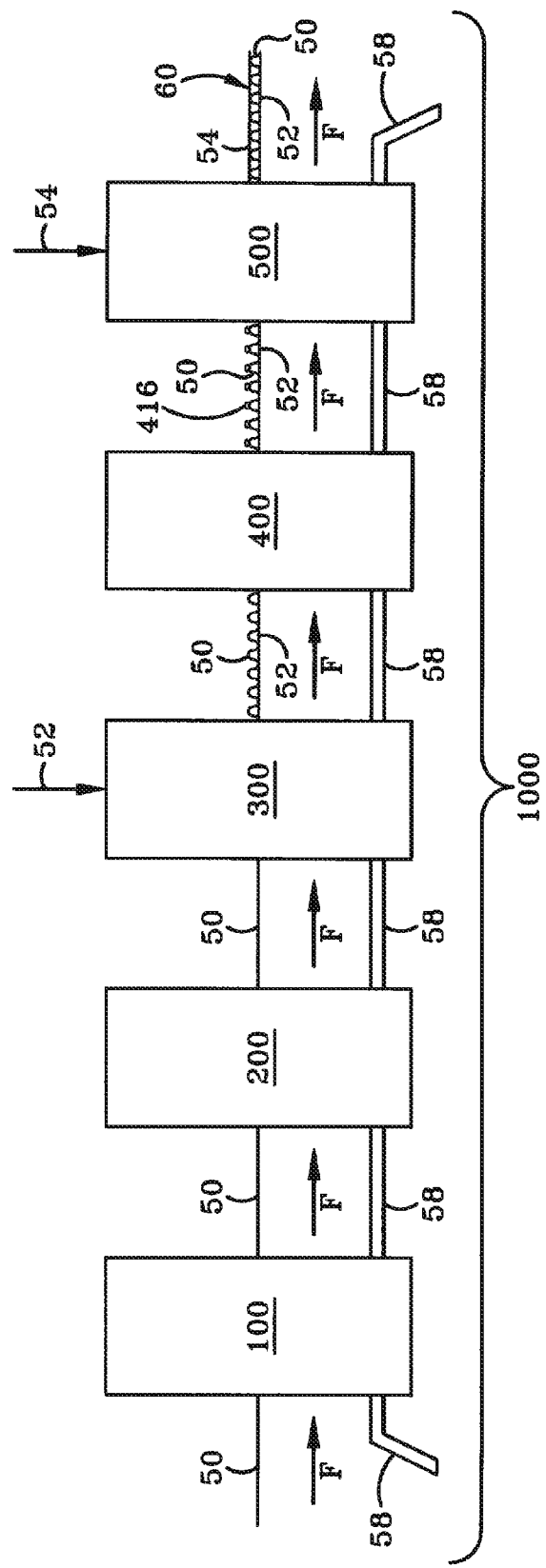
FIG. 3 is a schematic side view of the system of the present invention for producing a sheet of manufactured paperboard.

As shown in FIG. 3, a block diagram of an exemplary corrugating apparatus and system 1000 of the present invention is shown schematically. System 1000 includes a medium material conditioning apparatus 100, a web heating arrangement 200, a single facer 300, a glue machine 400, and a double backer 500. The components are arranged in the recited order relative to one corrugating machine direction of a web of medium material 50 as it travels or Flows (Flow represented by Arrow "F") along a sheet material pathway, wherein the sheet material pathway is defined by the components 100, 200, 300, 400, and 500 of system 1000 in order to produce a finished corrugated product 60 upon exiting double backer 500 as schematically illustrated in FIG. 3. The medium material 50 will become the corrugated web to which a first liner 52 and a second liner 54 will be adhered on opposite sides to produce the finished corrugated paperboard 60.

Figure 4:
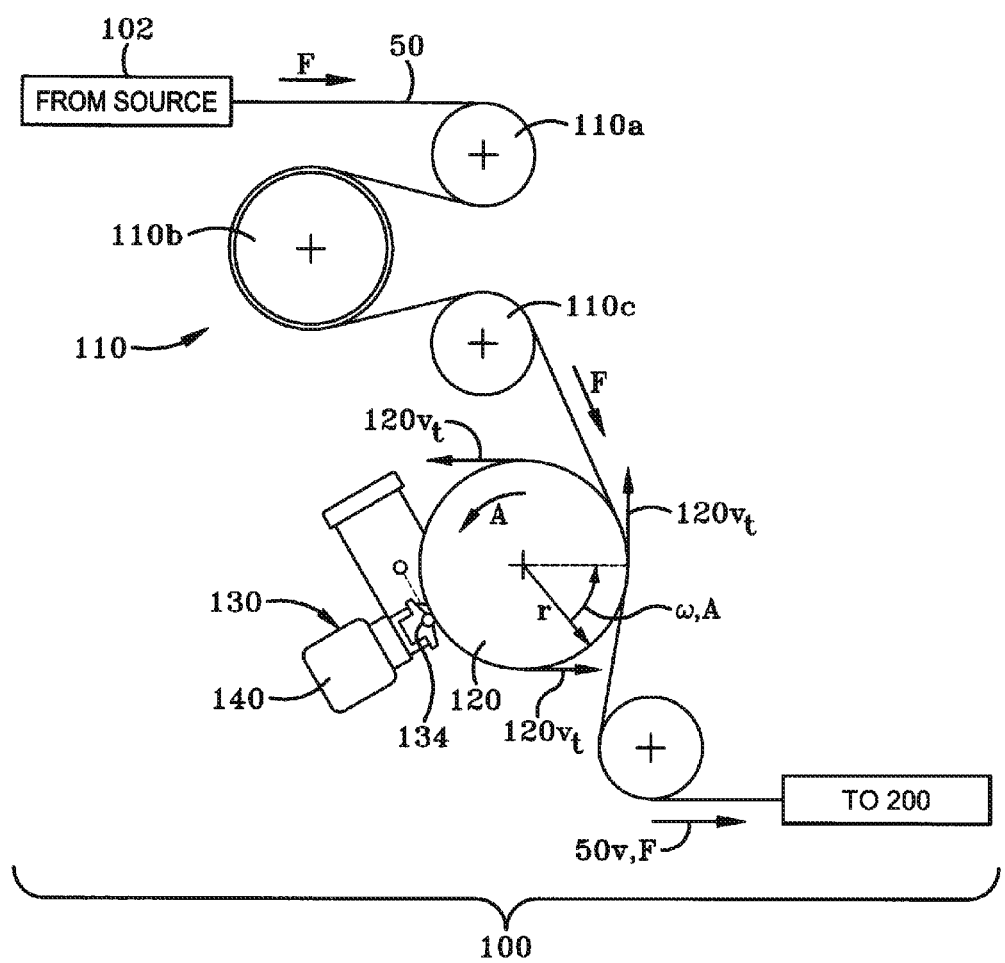
FIG. 4 is a side view of a conditioning apparatus of the present invention.
Figure 4A:
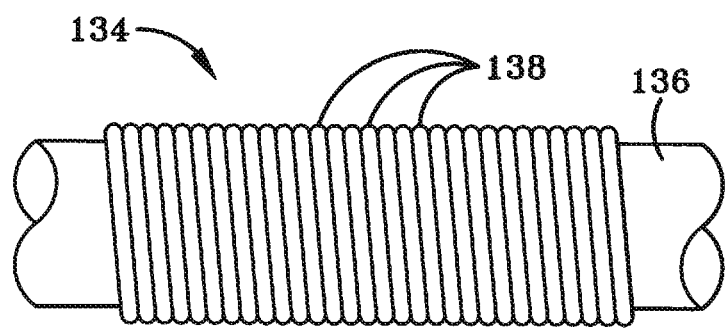
FIG. 4A is a side view of a metering rod assembly having a rod and threads.

As shown in FIG. 4, conditioning apparatus 100 comprises a pre-tension apparatus 110 including a first roll 110a, second roll 110b and third roll 110c. The three rolls 110a, 110b, 110c are each cylindrical having two ends with a substantially uniform cylindrical sidewall extending therebetween. Rolls 110a, 110b, 110c are connected to a frame 58 and extend laterally approximately perpendicular to flow F direction flowing along the sheet material pathway. Rolls 110a, 110b, 110c are longitudinally adjustable (in the upstream or downstream direction, when viewed from the side; FIG. 4) to control a desired about of tension in material 50 as it flows along the sheet material pathway.

First roll 110a rotates about an axis substantially perpendicular to the downstream direction of flowing material 50 as indicated by Arrow(s) F. Preferably, first roll 110a is positioned vertically above third roll 110c. When viewed from the side (FIG. 4), second roll 110b is positioned longitudinally upstream from rolls 110a and 110c, and second roll 110b is positioned vertically between first roll 110a and third roll 110c. The material pathway extends over the outer surface of each roll 110a, 110b, 110c, thus as material 50 is fed along the pathway, material 50 forms a U-shape (when viewed from the side). Each roll 110a, 110b, and 110c of pre-tension apparatus 110 respectively keep material 50 flowing along the sheet material pathway at a desired tension and speed.

Conditioning apparatus 100 further includes a moisture application roller 120. Roller 120 defines a portion of the sheet material pathway. Moisture applicator roll 120 is configured to increase the amount of moisture percentage by weight (% wt.) within the sheet of material flowing through conditioning apparatus 100. Moisture application roller 120 includes two ends connected to the frame 58 having a cylindrical sidewall extending therebetween. Ends may be connected to the frame 58 via bearing or other conventionally known devices to permit rotation. The cylindrical sidewall of moisture application roller is constructed of a material to attract liquid (in this example water). The outer surface of cylindrical sidewall of roller 120 holds water via surface tension forces as roller 120 rotates about an axis. The rotational movement of roller 120 creates a tangential velocity 120v and an angular velocity. Clearly, the tangential velocity 120$v_t$ and the angular velocity are dependent on radius of cylindrical roller 120. The formulaic relationship is v=rω; where v=the tangential velocity 120$v_t$ of outer surface of roller 120, r=the radius of roller 120 measured from the center to the outer surface, and ω=the angular velocity of roller 120.

Roller 120 rotates in the direction of Arrow A (FIG. 4). The rotation causes outer surface of roller 120 to move in a direction opposite the direction of material 50 flowing (in the direction of Arrow(s) F) along the sheet material pathway at a surface tangential velocity 120$v_t$. The tangential velocity 120$v_t$ of outer surface of moisture application of roller 120 depends on and is a percentage of the linear speed 50v of material 50 moving F along the sheet material pathway.

Roller 120 contacts one side of medium material 50 and applies moisture to the side of 50 in contact with the surface of roller 120. While the shown embodiment discloses one moisture application roller 120, clearly a second moisture application roller positioned on the opposite side of sheet 50 from first roller 120 is possible to dually pre-wet sheet 50 from each side.

Figure 4B:
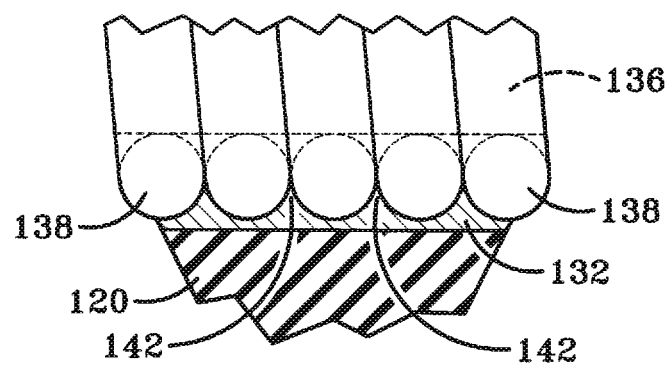
FIG. 4B is a cross section view of the metering rod and threads positioned closely adjacent an applicator roll to meter an amount of liquid onto the outer surface of the applicator roll.

A moisture metering device 130 is positioned closely adjacent the outer surface of applicator roller 120 to apply a thin film of liquid or moisture 132 (FIG. 4B) to outer surface of roller 120. The thin film of liquid 132 can include any or all of water, adhesives, additives, and/or other liquids which may have various solids or gases contained therein. For clarity, the following examples used throughout herein will be described with reference to liquid being water though it is entirely possible that other fluid combinations may be used. Metering device 130 includes a rod assembly 134 containing an elongated cylindrical shaft 136 wrapped or circumscribed by threads 138. Rod 136 is positioned along an axis parallel to axis of applicator roller 120. In some embodiments rod 136 may be fixed and in another embodiment rod 136 may rotate about its axis. In the rotatable embodiment, each end of rod 136 may be connected to device 130 via a plurality of bearings to allow rod 136 to rotate about its axis. Additionally rod 136 may connect to the frame for securing rod adjacent roller 120. Metering device 130 may further include a liquid storage chamber or liquid source 140 in fluid communication with grooves 142. Grooves 142 are defined by the convex outer surface of threads 138. Groove 142, when viewed in cross-section (FIG. 4B), forms continuous but non-linear voids for carrying and transferring water to surface of applicator roll 120. Additionally, other conventionally known metering rod devices comprising elements such as various channels or fluid pressure members to drive water or fluid towards channel 142 are clearly impossible. When such bladder driven fluid pressure devices are used, pressure may be continuous and uniform along the entire length of the metering rod, or clearly it may be semi-continuous and non-uniform if preferred for a certain application.

Rod 136 is connected to the frame 58 such that rod 136 does not deflect up nor down as a result of the hydrostatic pressure with respect to rotating roller 120. Rod 136 remains substantially parallel and in the same plane during operation. Therefore, rod 136 produces a uniform thickness or coating of liquid on outer circumferential surface of roller 120 moving at tangential velocity v in the direction of Arrow A.

The sheet of medium material 50 flows F along the sheet material pathway at a linear velocity 50v. There are a series of speed threshold ranges, wherein the linear velocity of the flowing F medium material 50 is within one of the threshold ranges, the ranges defining a numerical boundary for the percentage amount of the tangential velocity 120$v_t$ of the applicator roll 120, thereby determining the amount metered liquid applied to the applicator roll 120 and thus available to be transferred to material 50. The speed threshold ranges form a stepwise graph function such that the tangential velocity 120$v_t$ of the applicator roll 120 is the same percentage of the material linear velocity for the any linear material velocity within a respective step of the stepwise graph function. The amount of liquid metered onto the applicator roll 120 depends on the angular velocity of the applicator roll 120 and the tangential velocity 120$v_t$ of the applicator roll 120 is a percentage of the linear velocity 50v of the flowing sheet of medium material 50 within a speed threshold range. Linear velocity 50v is preferably measured downstream from double backer 500 (FIG. 3) by a speed measuring device mounted adjacent the material pathway. However, it is clearly contemplated that the speed measuring device may be mounted in other locations for measuring line speed 50v to determine tangential velocity 120$v_t$ of the applicator roll 120.

The speed threshold ranges of the linear velocity 50v of material 50 flowing F along the sheet material pathway include a first range from about 1 foot per minute (FPM) to about 150 FPM; a second range from about 150 FPM to about 350 FPM; a third range from about 350 FPM to about 650 FPM; a fourth range from about 650 FPM to about 1000 FPM; a fifth range from about 1000 FPM to about 20,000 FPM. When system 1000 is operational the linear velocity 50$v$ of the flowing F medium material 50 is within one of the first, second, third, fourth, and fifth ranges.

By way of non-limiting example, if a metering rod 136 is a size 6 metering rod as one would understand in the art, then when the linear velocity 50$v$ of the flowing material 50 is within the first range, the tangential velocity 120$v_t$ of the applicator roll 120 is about 40% to about 30% of the linear velocity 50$v$ of the flowing medium material 50. When the linear velocity 50$v$ of the flowing material 50 is within the second range, the tangential velocity 120$v_t$ of the applicator roll 120 is about 30% to about 20% of the linear velocity 50$v$ of the flowing medium material 50. When the linear velocity 50$v$ of the flowing material 50 is within the third range, the tangential velocity 120$v_t$ of the applicator roll 120 is about 20% to about 7% of the linear velocity 50$v$ of the flowing medium material 50. When the linear velocity 50$v$ of the flowing material is within the fourth range, the tangential velocity 120$v_t$ of the applicator roll 120 is about 7% to about 4% of the linear velocity 50$v$ of the flowing medium material 50. And, when the linear velocity 50$v$ of the flowing F material 50 is within the fifth range, the tangential velocity 120$v_1$ of the applicator roll 120 is about 4% to about 2% of the linear velocity 50$v$ of the flowing medium material 50.

By way of an additional non-limiting example, if metering rod 136 is a size 10 as one in the art would understand, then when the linear velocity 50$v$ of the flowing material 50 is within the first range, the tangential velocity 120$v_t$ of the applicator roll 120 is about 120% to about 30% of the linear velocity 50$v$ of the flowing medium material 50. When the linear velocity 50$v$ of the flowing material 50 is within the second range, the tangential velocity 120$v_t$ of the applicator roll 120 is about 110% to about 15% of the linear velocity 50$v$ of the flowing medium material 50. When the linear velocity 50$v$ of the flowing material is within the third range, the tangential velocity 120$v_t$ of the applicator roll 120 is about 100% to about 7% of the linear velocity 50$v$ of the flowing medium material 50. When the linear velocity 50$v$ of the flowing material is within the fourth range, the tangential velocity 120$v_t$ of the applicator roll 120 rotates is about 95% to about 4% of the linear velocity 50$v$ of the flowing medium material 50. And, when the linear velocity 50$v$ of the flowing material is within the fifth range, the tangential velocity 120$v_t$ of the applicator roll 120 is about 70% to about 2% of the linear velocity 50$v$ of the flowing medium material 50.

Figure 5:
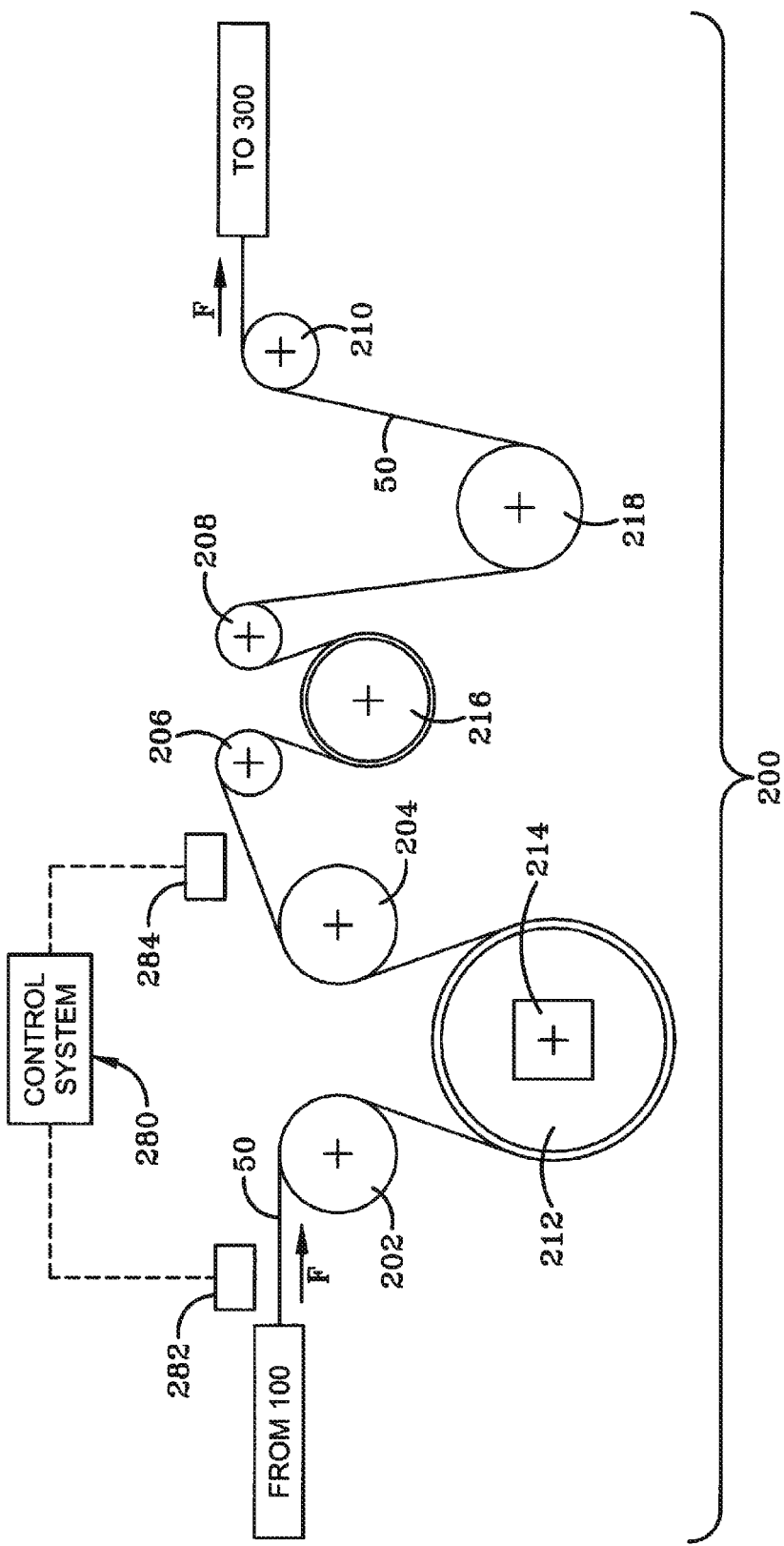
FIG. 5 is a side view of a heating apparatus of the present invention.

With primary reference to FIG. 5, a web heating arrangement 200 includes a plurality of idle rollers 202, 204, 206, 208, 210 each connected to the frame 58 and rotating about a respective axis all of which extend laterally and substantially perpendicular to the flow direction F of sheet material 50 along the pathway. Heating arrangement 200 further includes heating roll 212 operatively connected to a heat source 214, a first drive roller 216 and a second drive roller 218. Heat source 214 is contemplated being a compressed steam system as conventionally understood in the art. The compressed steam ("steam" refers to water is its gaseous state) in heat source 214 increases in temperature as more pressure is imparted into the steam. Steam produced from source 214 is in communication with heat roll 212 and preferably contained therein. The steam contained in roll 212 imparts a temperature to the outer surface of the roll 212 through conductive, radiant, or convective heat transfer. Clearly, additional types of heating device used to heat rollers in similar paperboard manufacturing processes may be substituted for the compressed steam system heating.

Steam temperature pressure tables are well known in the art. Pressurized or compressed steam tables indicate the gauge pressure of steam, in pounds per square inch (psi), and the corresponding temperature of the saturated steam. An exemplary Steam Temperature Pressure Table is provided below in Table 1:

TABLE 1

| Pressure of Steam (in psi) | Corresponding temperature of saturated/pressurized steam (in ° F.) |
|---|---|
| 0 | 212 |
| 50 | 298 |
| 70 | 316 |
| 75 | 320 |
| 80 | 324 |
| 85 | 328 |
| 90 | 331 |
| 95 | 335 |
| 100 | 338 |
| 105 | 341 |
| 110 | 344 |
| 115 | 347 |
| 120 | 350 |
| 130 | 355 |
| 140 | 361 |
| 150 | 366 |
| 175 | 377 |
| 200 | 388 |

Each of the rolls 202, 204, 206, 208, 210, 212, 214, 216, and 218 respectively define a portion of the sheet material pathway along which material 50 flows F downstream from the pre-wetting apparatus 100 towards the corrugator 300. Heating arrangement 200 further includes a moisture control system 280 electronically connected to one or more moisture measurement devices 282, 284. Control system 280 is configured to provide a closed loop control of moisture measuring system in the web 50 flowing downstream. The moisture measurement device 280 can measure moisture in the paper web 50 before and after paper is heated by roll 212 of heating arrangement 200. Control system 280 may contain computer logic software or other integrated software to operate free from human monitoring.

Rollers 202 and 204 are preferably positioned above heat roller 212. When viewed from the side (as in FIG. 5), material 50 forms a U-shape pathway between rollers 202, 204 and heat roller 212. Idle rollers 206 and 208 are positioned downstream from heat roller 212. Rollers 206 and 208 are positioned above drive roller 216 and form a second U-shaped pathway therewith. Second drive roller 218 and idle roller 210 are positioned downstream from idle roller 208 and form a third U-shaped pathway therewith.

Preferably, and with continued reference to heating apparatus 200, when the medium material 50 (FIG. 5) flows F through heating device 200, material 50 is preferably heated via contact with heat roll 212 to a temperature in a range from 150 degrees Fahrenheit to 170 degrees Fahrenheit. When first liner 52 traverses through heating device 200 (FIG. 6; liner 52 flowing "FROM 200"), liner 52 is heated via a heat roll, same as 212, to a temperature in a range from about 185 degrees Fahrenheit to about 205 degrees Fahrenheit. Providing medium 50 at a lower temperature than liner 52 provides unexpected results that reduce warping and produce a flatter paperboard 60. Further, second liner 54 (FIG. 8; second liner 54 flowing "FROM 200") is heated, via a heat roll same as 212, to a temperature up to but not exceeding about 130 degrees Fahrenheit, and is preferably heated to a temperature of 120 degrees Fahrenheit. Further, when producing a "double-backed" sheet of paperboard 60, providing the second liner 54 at a temperature less than medium 50 and first liner 52 provides unexpected results that reduce warping and produce a flatter paperboard 60.

Figure 7:
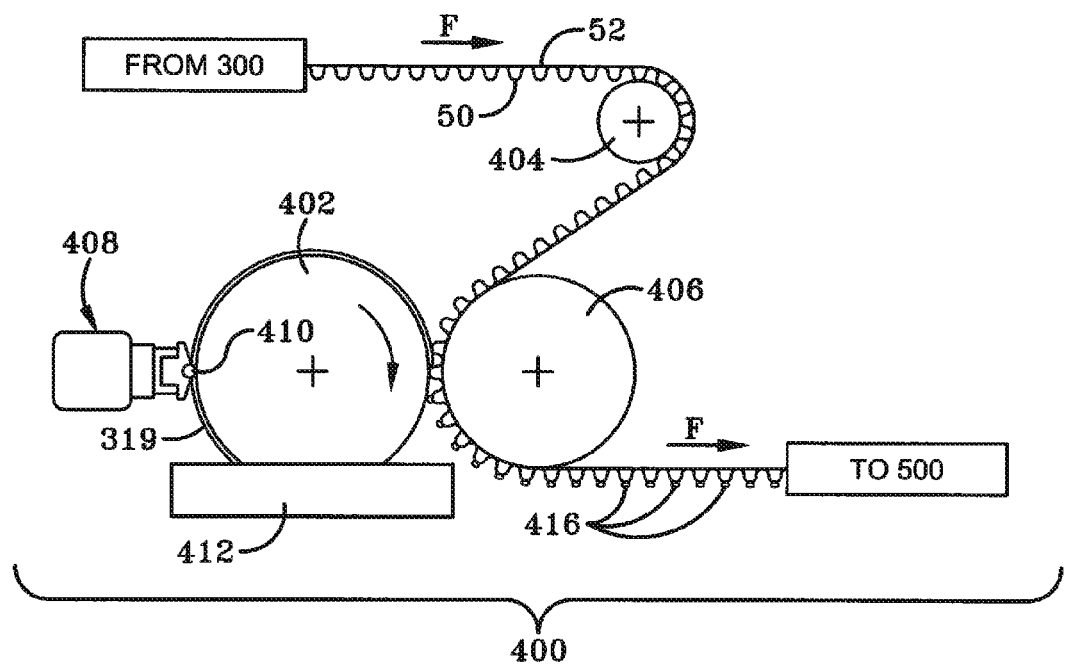
FIG. 7 is a side view of an adhesive applicator apparatus of the present invention.

As shown in FIG. 7, single facer machine 300 includes a first corrugating roller 302, a second corrugating roller 304, an adhesive roller 306, and a single facing roller 308. Corrugating rollers 302, 304 define a portion of a corrugating device 303. Single facing roller 308 and corrugating roller 304 define a portion of a paperboard facing device 307. First and second corrugating rollers 302, 304 are connected to frame 58 and extend laterally and substantially perpendicular to flow direction F of material 50 and define a portion of the sheet material pathway. Each of first and second corrugating rollers 302, 304 include a plurality of teeth 310 that cooperate to nestingly fit in a series of complimentary peaks and valleys. The respective complimentary peaks and valleys of teeth 310 of each roller 302, 304 meet at a corrugating nip 312. Nip 312 therethrough defines a portion of the sheet material pathway. Material 50 flows through nip 312 and is corrugated into a sinusoidal shape by cooperating complimentary teeth 310 of rollers 302, 304. Roller 302 rotates about its axis in the same direction as flow F. Similarly, roller 304 rotates about its axis in the same direction as flow F.

Adhesive roller 306 is positioned closely adjacent corrugating roller 304. Adhesive roller 306 contacts corrugated sheet 50 at the peaks to deposit a bead of adhesive 314 thereon. Adhesive roller 306 cooperates with an adhesive metering device 316 and an adhesive source 318. Adhesive metering device 316 includes a metering rod 320. Adhesive metering rod 320 includes similar threaded features as metering device 134 to meter the amount of adhesive rotatably applied to outer surface of roll 306. As in metering device 134, the metering rod 320 is adjustable to move towards or away from the outer surface of roll 306 to precisely set the gap therebetween. When the gap is set to near contact such that rod 320 is in near contact with applicator roll 306, nearly all the adhesive is removed from the outer surface of roll 306, excluding the adhesive 322 that passes through the channels 142 defined by threads 138. Rod 320 may be adjusted for form a larger gap to allow nearly all adhesive to remain on the outer surface of rod 320. Adhesive source 318 containing adhesive composition 319 is described in greater detail below with reference to FIG. 11.

Single facing roller 308 is in communication with a heat source 315. Heat source 315 is preferably a compressed or pressurized steam device. Heat source 315 drives compressed steam into roller 308 in order to heat roller 308. Heat source 315 may be connected to heat source 214, or may be its own independent unit. As explained supra, the compressed steam pressure has an associated temperature, and thus heats up roll 308 containing the pressurized steam therein. The pressurized steam in communication with roll 308 should be less than 175 psi, and preferably is 150 psi. Steam in communication with roll pressurized at 150 psi imparts a temperature of about 365° F. to roll 308. Roll 308 should not be heated to a temperature greater than 377° F. (the temperature of steam compressed to 175 psi).

With primary reference to FIG. 7, glue machine 400 includes an adhesive roll applicator 402, a first roller 404, and a second roller 406, an adhesive metering device 408 having a metering rod 410, and an adhesive source 412. First and second rollers 404, 406 define a portion of the sheet material pathway. Applicator 402 defines a portion of the sheet material pathway and is positioned substantially perpendicular to flow direction F. Applicator 402 is centered and rotates about an axis causing outer surface of applicator 402 to move in the same direction as flow F. Meter rod 410 is substantially similar to metering rod 320 and likewise adjustable as previously described herein supra to meter an amount of adhesive from source 412 to create an amount of surface adhesive 414. Adhesive applicator 402 is positioned closely adjacent roll 406 such that adhesive 414 on the outer surface of roll 402 contacts the corrugated flutes to deposit a bead of adhesive 416 on the flutes opposite where bead 318 attaches liner 52 to medium 50.

Figure 8:
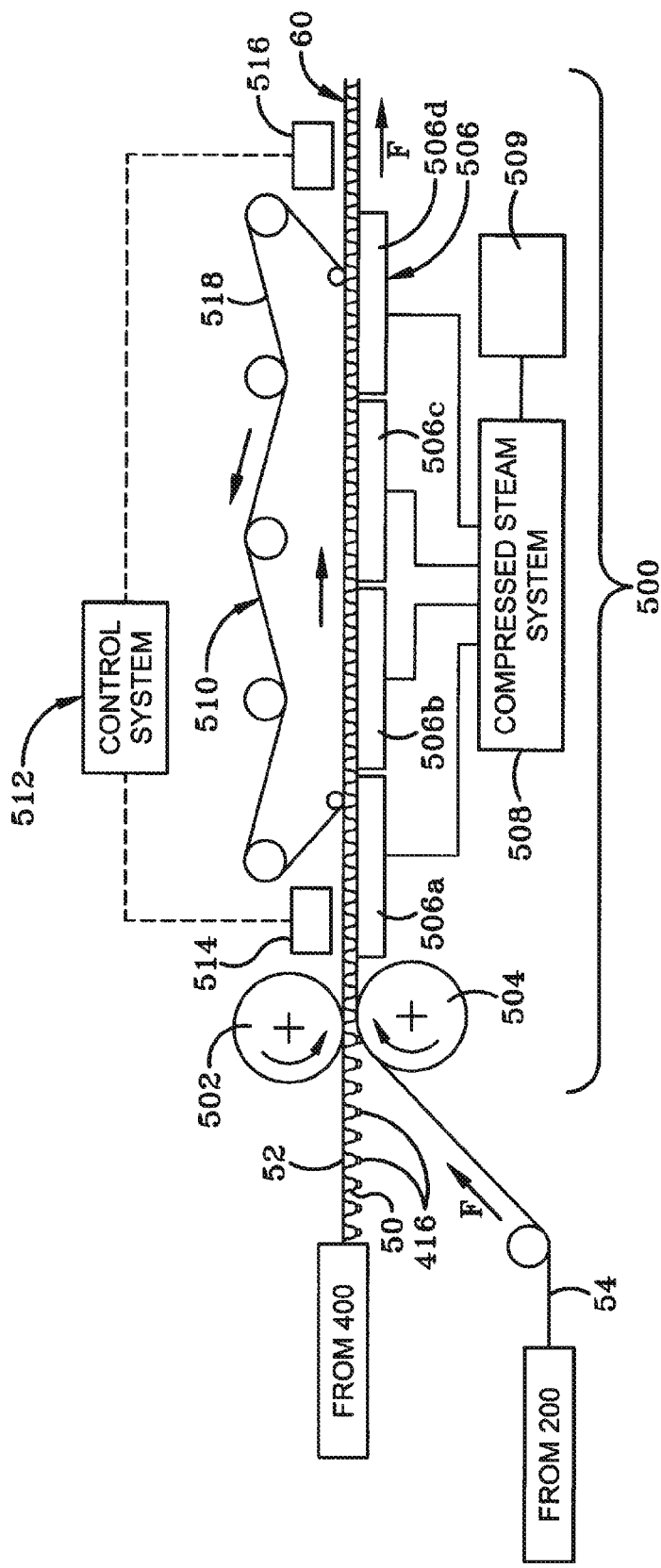
FIG. 8 is a side view of a double backer machine, the double backer including a set of rollers to attach a second liner to the corrugated medium material, the double backer also including a set of hot plates to cool the material and cure the adhesive.

As shown in FIG. 8, double backer 500 includes a first roller 502, a second roller 504, a plurality of hot plates 506 operatively connected to a plate temperature (or pressurized steam) control system 508, a drive system 510, and a monitoring control system 512. Double backer 500 is configured to attach second liner 54 to corrugated medium 50 via adhesive bead 416. Double backer 500 is further configured to uniformly cool medium and liner material as the drive system 510 moves the formed paperboard 60 over hot plates 506. Hot plates 506 cooperate to define a bottom boundary of the flow stream F and sheet material pathway.

First roller 502 is positioned vertically above second roller 504 defining a gap therebetween. Sheet material pathway flows through and is partially defined by the gap. Rollers 502, 504 rotate about their respective axes such that the outer surface moves in the direction of the flow stream F. A pressure exerting device may be present to import an amount of pressure between material 50 and second liner 54 at bead 416. Second liner 54 is pre-conditioned in 100 and heated in heating apparatus 200 (to a temperature not exceeding 130° F., and preferably 120° F.) prior to being fed into double backer 500.

Control system 508 is in communication with a heat source 509. Heat source 509 may be an independent system or it could be in communication with heat sources 214 and 315. Preferably, Heat sources 509, 214, and 315 are derived from one pressurized steam generator. Control system 508 regulates the amount of pressurized steam driven to each respective plate within the set of hot plates 506. Further, plates 506 define a storage chamber or passageway for containing pressurized steam therein. Similar to the heating rolls, the pressurized steam containment chamber within plates 506 imparts or transfers a desired temperature to the outer surface of the hot plates 506.

In a preferred embodiment of present invention 1000, hot plates 506 vary in temperature to cool and cure the adhesive. While not necessarily intuitive at first, the inventors have found that this non-uniform temperature hot plate arrangement actually encourages uniform evaporation from material 50, 52, 54, to create paperboard 60 that is free from any warping. This arrangement has yielded fascinating and unexpected results over similar machines, such as the Kohler device identified in U.S. Pat. No. 8,398,802 and discussed supra in the Background. These prior art devices tend to use hot plates at temperatures exceeding 330° F. These temperatures tend to cause more steam to flash from the drying paperboard 60, which can often lead to non-uniform evaporation. Hot plates 506 of the present invention are preferably all near or below 330° F. to reduce or even prevent the uneven flashing evaporation of steam leaving the paperboard 60.

Two hot plates 506 may have a same temperature. Preferably, there are at least four hot plates 506a, 506b, 506c, 506d arranged side-to-side from upstream to downstream, wherein the hot plate with the lowest temperature is positioned in the most upstream position of the four plates as in 506a. In this arrangement the temperature of each plate does not decrease relative to the other plates from the upstream position to the downstream position. So by way of non-limiting example, a first plate 506a is positioned in the most upstream position relative to the other hot plates 506, having a temperature in a range from 312° F. to 320° F. (heated with pressurized steam at 65 psi to 75 psi); a second plate 506b is positioned downstream from the first plate 506a having a temperature in a range from 320° F. to 328° F. (heated with pressurized steam at 75 psi to 85 psi); a third plate 506c is positioned downstream from the second plate 506b having a temperature in a range from 320° F. to 328° F. (heated with pressurized steam at 75 psi to 85 psi); and a fourth plate 506d is position downstream from the third plate 506c having a temperature in a range from 328° F. to 333° F. (heated with pressurized steam at 85 psi to 95 psi). Further preferably, additional embodiments include wherein no hot plate 506 has a temperature exceeding about 330° F. (heated with pressurized steam at 90 psi). More specifically, the first hot plate 506a temperature is 316° F. (heated with pressurized steam at 70 psi), the second hot plate 506b is 324° F. (heated with pressurized steam at 80 psi), the third hot plate is 324° F. (heated with pressurized steam at 80 psi), and the fourth hot plate is 330° F. (heated with pressurized steam at 90 psi). These temperatures are controlled by temperature control system 508 operatively connected to each respective plate 506. Control system 508 may contain computer logic software or other integrated software to operate free from human monitoring.

One or more moisture measurement devices 514, 516 and corresponding control system 512 can be used for one or all materials 50, 52, 54 to be heated to provide a closed loop control of moisture in each individual sheet of material 50, 52, 54 that make up completed paperboard 60. Further, drive system 510 may include a plurality of drive rollers to move a belt 518 in a loop to move formed paperboard 60 over hot plates 506. Control system 512 may contain computer logic software or other integrated software to operate free from human monitoring.

Figure 10:
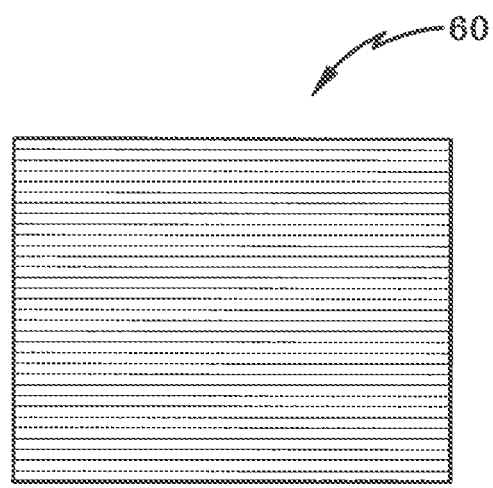
FIG. 10 is a top view of the sheet of paperboard manufactured by the method and system of the present invention.

The term "logic", as used herein, with reference to control systems 280 (FIG. 5), refers to and includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a device to read a software medium, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics As shown in FIG. 10, paperboard 60 upon exiting double backer 500 dries at an even rate and contains no warping when viewed from the side. The term no warping refers to a sheet of manufactured paperboard 60 that is substantially flat and planar with no deflection upwardly or downwardly. As shown in FIG. 10, paperboard 60 further has even and uniform adhesive lines which form a proper lamination between components 50, 52, 54 which make up paperboard sheet 60.

With primary reference to adhesive source 318 and FIG. 11, adhesive source 318 includes an adhesive composition 319 comprising: water 1102, a rheology modifier or additive 1104, a starch 1106, a caustic or alkaline hydroxide 1108, at least one borate 1110, a biocide 1112, a defoamer 1114, and a penetrating agent 1116. These components are mixed together in distinct time intervals 1101, 1103, 1105, 1107, and 1109. Further, during adhesive 319 manufacture (described in detail below), some components are heated 1115 to a first temperature 1125, then more components are added, and the mixture re-heated 1113 to a second temperature 1127.

Water 1102 is preferably drawn from a municipal source, however clearly other water sources providing potable or filtered non-potable water are entirely possible. Preferably, a second amount of water 1111 and flush water 1118 used during the production of adhesive compound 319 can be drawn from the same water source as 1102.

Rheology modifier 1104 is a high molecular weight water-soluble polymeric material. The rheology modifier 1104 can be either a synthetic polymer or a naturally occurring polymer. Examples of synthetic high molecular weight water-soluble polymeric materials are carboxymethylcellulose, hydroxyethylcellulose, polyacrylic acid, polyvinylacrylic acid polyacrylamide, polyvinyl alcohol, and polyoxyethylene. Examples of naturally occurring high molecular weight water soluble polymeric materials include xanthan gum and guar gum. The rheology modifier in the Stein Hall adhesive composition of the present invention modifies the rheology of the composition in such a manner that up to a 50% decrease in the amount of adhesive composition is applied. For example, this can be accomplished by setting the metering gap on the adhesive composition applicator rolls to be decreased by up to 50%, thereby lowering the amount of adhesive placed on the flute tip by up to 50%. The term "synthetic polymer" as used herein refers to a compound that is chemically made and can be used as a rheology modifier. Synthetic polymer compounds can include carboxymethylcellulose, hydroxyethylcellulose, polyacrylic acid, polyvinyl acrylic acid, polyacrylamide, polyvinyl alcohol, and polyoxyethylene. The term "naturally occurring polymer" as used herein refers to a compound that is found in nature that can be used as a rheology modifier. Naturally occurring polymer compounds can include xanthan gum and guar gum.

Starch 1106 refers to a carbohydrate having a large number of glucose units joined together through glycosidic bonds as a polysaccharide. Starches can be modified chemically or used without modification (i.e., naturally occurring). Modified starches are native starches which have been modified e.g. by enzymatic, chemical and/or heat treatment and include, by way of example only, oxidised starches, acid-thinned starches, esterified starches, etherified starches, dextrins, maltodextrins, cross-linked starches and the like. A "gelatinized starch" is a starch compound where heat or chemicals such caustic 1108 is applied or added to it. It is sometimes referred to as the primary or carrier starch as it is often the first starch compound added to the adhesive composition. A secondary starch 1122 may refer to the same or another type of starch as 1106.

Caustic 1108 refers to a compound that contains the anion [OH]. This can include compounds by way of non-limiting example, sodium hydroxide, potassium hydroxide, calcium hydroxide, and the like. Borate 1110 refers to a chemical compound containing boron ions, including but not limited to, sodium borate, sodium tetraborate, and disodium tetraborate. Further, a second borate 1120 or secondary borax may refer to the same or another type of borate as 1110 in the manufacture of adhesive composition 319.

Biocide 1112 is a chemical agent designed to kill or reduce mold and bacteria not only within adhesive compound 319 but throughout system 1000. Biocide 1112 assists in eliminating the mold and bacteria naturally exposed to starch 1106 during the manufacture of adhesive 318. The mold and bacteria have devasting results if left untreated, for example, if bacteria are left untreated, it will spread throughout system 1000 making the bonding process extremely difficult. By way of non-limiting example, biocide 1112 may be one of or a combination of B-141®, Proxel® GXL, and KK™ 909, all manufactured and distributed by Corrugated Chemicals Incorporated of Knoxville, Tenn. Biocides are often commercially available in both liquid and powdered form, each of with are contemplated for use herein.

Defoamer 1114 is a composition, preferably wholly organic, that provides rapid foam reduction. Defoamer 1114 does not affect the viscosity of starch 1106 when mixed within adhesive 318. Preferably, defoamer 1114 is one or more of the following: a rapid response of foam created during adhesive manufacture; long lasting; of a food grade organic quality; and capable of being pumped. By way of non-limiting example, defoamer 1114 can be one of or a combination of No-Foam™211 and No-Foam™ 315, both of which are manufactured and distributed by Corrugated Chemical Incorporated, of Knoxville, Tenn.

Penetrating agent 1116 is a compound configured to overcome the hard-to-penetrate mediums 50 and liners 52, 54 often used in paperboard manufacturing process. Medium 50 and liners 52, 54 often contain some amount of recycled fiber and softwood, which makes them difficult to process by a corrugator. Essentially, recycled mediums 50 and recycled liners 52, 54 are more stiff than conventional paper free of recycled products. The recycled products also make it difficult to product a quality bond with adhesive 318 because the mediums 50 and liners 52, 54 having recycled products prevent starch 1106 from penetrating the paper fiber, which is critical for a strong bond to occur. By way of non-limiting example, penetrating agent 1116 can be any one of or a combination of Bond-Aid® and Bond-Aid® Plus, both of which are manufactured and distributed by Corrugated Chemical Incorporated, of Knoxville, Tenn.

Figure 12:
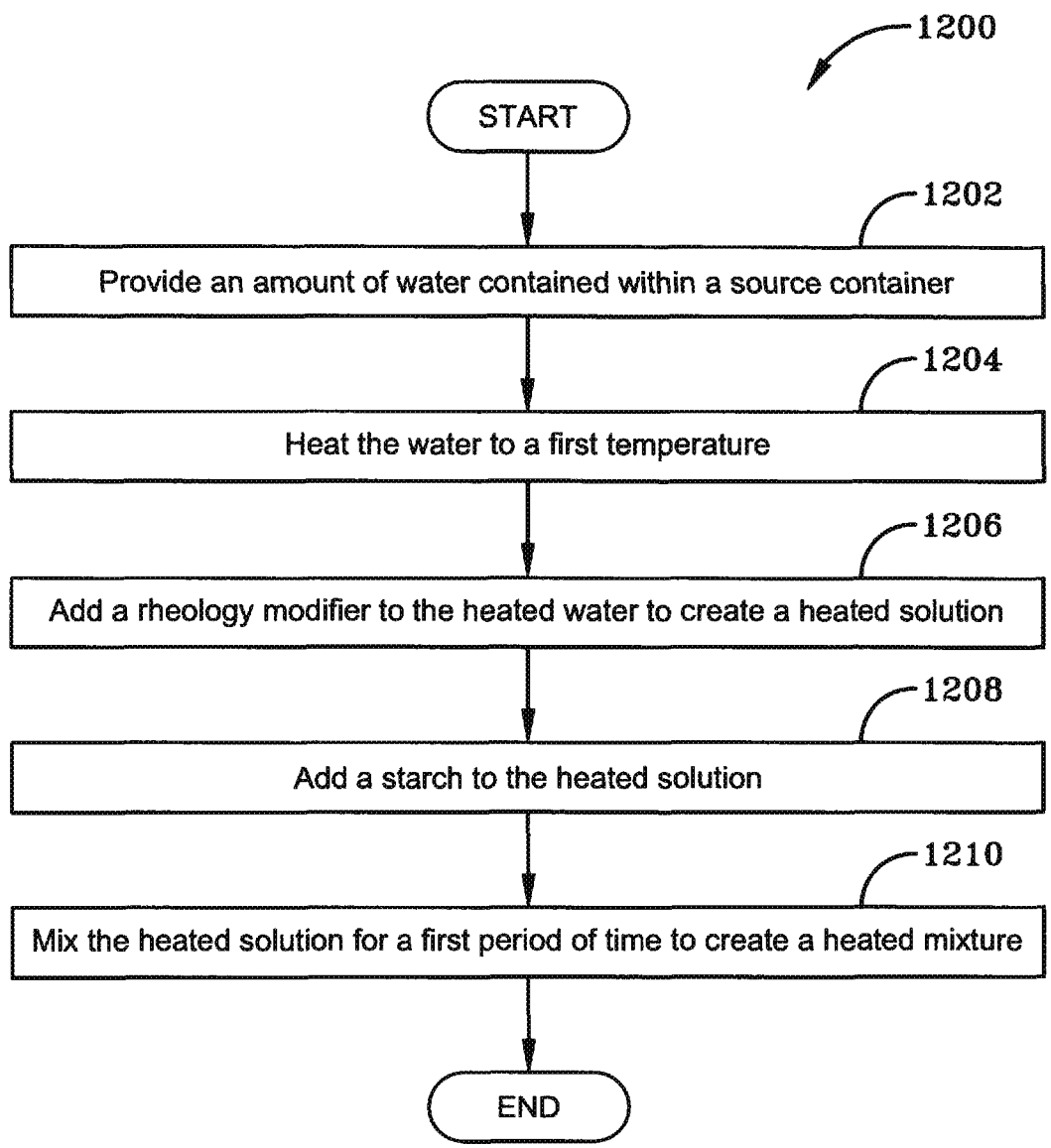
FIG. 12 is an exemplary flow chart of a method for manufacturing the adhesive used in the paperboard manufacturing process.

FIG. 12 depicts a box diagram flow chart of a method of manufacturing an adhesive compound, shown generally as 1200. The method 1200 comprises the steps of: providing an amount of water contained within a source container, shown as 1202; heating the water to a first temperature, shown as 1204; adding a rheology modifier to the heated water to create a heated solution, shown as 1206; adding a starch to the heated solution, shown as 1208; and mixing the heated solution for a first period of time to create a heated mixture, shown as 1210. Additional dependent steps from method 1200 are described in greater detail below. Method 1200 is shown for exemplary purposes only, it is clearly understood that additional steps may be added thereto or some of the enumerated steps to be removed therefrom.

In accordance with one aspect of an embodiment, the present invention provides a method for producing an adhesive using a non-continuous mix cycle or multiple distinct mixing time periods. Namely, rather than mixing all components of the adhesive 318 together for a period of time (i.e., eight minutes as taught by the '049 Application), the present invention provides a staggered mixing cycle broken into a plurality of distinct mixing cycles.

In accordance with an additional aspect of an embodiment, the present invention provides a method of producing an adhesive that will bond with liner 54 at a desired temperature. Namely, adhesive composition 319 manufactured with the distinct mixing time periods allows adhesive 319 to bond with second liner 54 heated to a temperature around 120° F., rather than the required liner temperature of 70° C.-90° C. (158° F.-194° F.) taught in the '049 Application.

In operation and with primary reference to FIG. 5, a web of medium material 50 is fed into the medium conditioning apparatus 100 from a source 102, preferably a paper roll for making paperboard or cardboard as is commonly known in the art. Upon entering the medium conditioning apparatus 100, material 50 can be first fed through a pre-tensioning mechanism 110 and then passed through a pre-wetting moisture application roller 120. Moisture application roller 120 contacts and applies liquid or moisture to the medium material 50 to adjust its moisture content in a desired range prior to exiting apparatus 100.

Some exemplary moisture ranges claimed in the Kohler '802 patent are in the range of 6-9% wt. System 1000 can operate outside of these moisture ranges when necessary, either lower than 6% wt. or higher than 9% wt. For example, when material 50 is flowing F, roll 120 is configured to apply or otherwise impart a moisture content into material 50 in the range of 10-18% wt. Additionally, if either liner 52 or second liner 54 is flowing F through conditioning apparatus 100, roll 120 is configured to impart a moisture content in the range of 32-42% wt into liner 52 or second liner 54.

In operation and with continued reference to the moisture applicator roller 120, when the flowing F linear velocity 50$v$ of material 50 is plotted against the tangential velocity 120$v_t$ a value exists indicating the tangential velocity percentage in a threshold range. While a previously given example provided alternative threshold ranges, the following ranges are also contemplated. When the medium material 50 is flowing F within a first threshold range from about 1 foot per minute (FPM) to about 100 FPM, the tangential velocity 120$v_t$ of the outer surface of the applicator roll 120 is about 100% of the linear velocity of the medium material 50. When the medium material 50 is flowing within a second threshold range from about 100 FPM to about 300 FPM, the tangential velocity 120$v_t$ of the outer surface of the applicator roll 120 is about 80% of the linear velocity of the medium material 50. When the medium material 50 is flowing within a third threshold range from about 300 FPM to about 500 FPM, the tangential velocity 120$v_t$ of the outer surface of the applicator roll 120 is about 70% of the linear velocity of the medium material 50. When the medium material 50 is flowing within a fourth threshold range from about 500 FPM to about 800 FPM, the tangential velocity 120$v_t$ of the outer surface of the applicator roll 120 is about 55% of the linear velocity of the medium material 50. And, when the medium material is flowing within a fifth threshold from about 800 FPM and faster, the tangential velocity 120$v_1$ of the outer surface of the applicator roll 120 is about 45% of the linear velocity of the medium material.

It is further to be understood that first liner 52 is pre-conditioned or pre-wetted in a manner similar to medium material 50. For example, with reference to FIG. 7 where liner 52 flows "FROM 200" a sheet of liner material 52 flows along a liner material pathway at a linear velocity, and configured to adhere to a first fluted side of the corrugated medium material 50. A second applicator roll, similar to roll 120, rotatably connected to the frame and positioned adjacent the liner material pathway and upstream from where the liner material is adhered to the corrugated medium material at 314 along the liner material pathway. The second applicator roll is configured to apply a liquid to the flowing liner material 52. The second applicator roll has a length and a radius, wherein the second applicator roll rotates about a second axis at an angular velocity, and wherein an outer surface of the second applicator roll travels at a tangential velocity as the second applicator roll rotates. The second applicator roll transfers the liquid to the sheet of liner material 52 as the liner 52 flows by and adjacent the second applicator roll along the liner material pathway. A second metering device, similar to 130, adjacent the second applicator roll meters an amount of the liquid onto the second applicator roll. Similar to 120 and 130, the amount of liquid metered onto the second applicator roll depends on the angular velocity of the second applicator roll. Further, the tangential velocity of the second applicator roll is a percentage of the linear velocity of the flowing liner material 52.

Additionally, a second series of speed threshold ranges exist, the second threshold ranges defining a numerical boundary for a percentage amount of the tangential velocity of the second applicator roll relative to the linear velocity of the liner material 52, thereby determining the amount metered liquid applied to the second applicator roll, the ranges including: a first range from about 1 foot per minute (FPM) to about 150 FPM; a second range from about 150 FPM to about 350 FPM; a third range from about 350 FPM to about 650 FPM; a fourth range from about 650 FPM to about 1000 FPM; and a fifth range from about 1000 FPM to about 20,000 FPM. The linear velocity of the flowing liner material 52 is within one of the first, second, third, fourth, and fifth ranges. The speed thresholds form a stepwise graph function such that the tangential velocity of the second applicator roll is the same for any liner velocity within a respective step of the stepwise graph function. When the linear velocity of the flowing liner material 52 is within the first range, the tangential velocity of the second applicator roll is about 140% to about 30% of the linear velocity of the flowing liner material 52. When the linear velocity of the flowing liner material 52 is within the second range, the tangential velocity of the second applicator roll is about 130% to about 15% of the linear velocity of the flowing liner material. When the linear velocity of the flowing liner material 52 is within the third range, the tangential velocity of the second applicator roll is about 110% to about 7% of the linear velocity of the flowing liner material. When the linear velocity of the flowing liner material 52 is within the fourth range, the tangential velocity of the second applicator roll is about 90% to about 4% of the linear velocity of the flowing liner material. When the linear velocity of the flowing liner material 52 is within the fifth range, the tangential velocity of the second applicator roll is about 75% to about 2% of the linear velocity of the flowing liner material 52.

It is further to be understood that second liner 54 is pre-conditioned or pre-wetted in a manner similar to medium material 50. For example, with primary reference to FIG. 9 where second liner 54 flows "FROM 200" the sheet of second liner material 54 flows along a second liner material pathway at a linear velocity, and configured to adhere to the corrugated medium material 50 along a second fluted side opposite the first liner material at bead 416. A third applicator roll, similar to 120, is rotatably connected to the frame and positioned adjacent the second liner material pathway and upstream from where the second liner material 54 is adhered at 314 to the corrugated medium material 50 along the second liner material pathway, wherein the third applicator roll is configured to apply a liquid to the flowing second liner material and the third applicator roll having a length and a radius. The third applicator roll rotates about a third axis at an angular velocity, and wherein an outer surface of the third applicator roll travels at a tangential velocity as the third applicator roll rotates. The third applicator roll transfers the liquid to the sheet of second liner 54 material as the liner 54 flows by and adjacent the third applicator roll along the liner material pathway. A third metering device, similar to 130, adjacent the third applicator roll meters an amount of the liquid onto the third applicator roll. The amount of liquid metered onto the third applicator roll depends on the angular velocity of the third applicator roll. The tangential velocity of the third applicator roll is a percentage of the linear velocity of the flowing second liner material 54.

With continued reference to the third applicator roll, a third series of speed threshold ranges exist, the ranges defining a numerical boundary for a percentage amount of the tangential velocity of the third applicator roll relative to the linear velocity of the second liner material 54, thereby determining the amount metered liquid applied to the third applicator roll, the ranges including: a first range from about 1 foot per minute (FPM) to about 150 FPM; a second range from about 150 FPM to about 350 FPM; a third range from about 350 FPM to about 650 FPM; a fourth range from about 650 FPM to about 1000 FPM; and a fifth range from about 1000 FPM to about 20,000 FPM. The linear velocity of the flowing second liner material 54 is within one of the first, second, third, fourth, and fifth ranges. The speed thresholds form a stepwise graph function such that the tangential velocity of the third applicator roll is the same for any second liner 54 velocity within a respective step of the stepwise graph function. When the linear velocity of the flowing second liner material 54 is within the first range, the tangential velocity of the third applicator roll is about 160% to about 60% of the linear velocity of the flowing second liner material 54. When the linear velocity of the flowing second liner material 54 is within the second range, the tangential velocity of the third applicator roll is about 150% to about 40% of the linear velocity of the flowing second liner material 54. When the linear velocity of the flowing second liner material 54 is within the third range, the tangential velocity of the third applicator roll is about 140% to about 13% of the linear velocity of the flowing second liner material 54. When the linear velocity of the flowing second liner material 54 is within the fourth range, the tangential velocity of the third applicator roll is about 130% to about 5% of the linear velocity of the flowing second liner material 54. And, when the linear velocity of the flowing second liner material 54 is within the fifth range, the tangential velocity of the third applicator roll is about 115% to about 1% of the linear velocity of the flowing second liner material 54.

Figure 6:
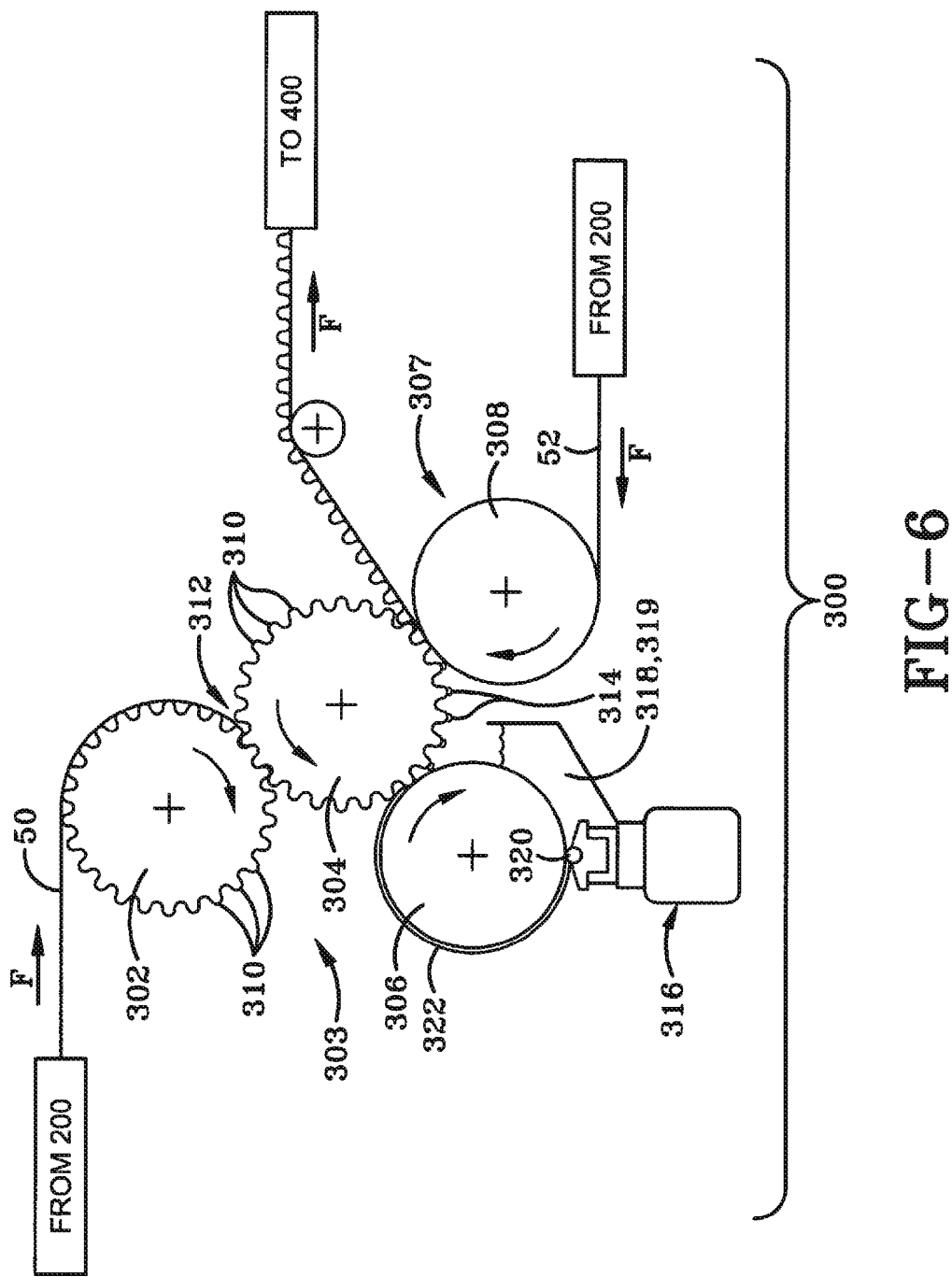
FIG. 6 is a side view of a single facing machine of the present invention, the single facing machine including a corrugating device to corrugate a medium material and a pressuring exerting device to attach a first liner to the corrugated medium.

In operation and with primary reference to FIG. 6, idle roller 202 directs or guides sheet material 50 towards heat roll 212. Outer surface of heat roll 212 contacts sheet material 50 as material 50 flows circumferentially around and along outer surface of heat roll 212 making substantial contact therewith. The amount of time sheet material 50 is in contact with the outer surface of heat roll 212 is known as the dwell time. Dwell time may be increased or decreased depending on the amount of heat desired to be transferred to paper web 50. As briefly detailed above, if medium material 50 is flowing over heat roll 212, medium 50 is heated to a temperature in a range from 150 degrees Fahrenheit to 170 degrees Fahrenheit (as shown in FIG. 6; 50 flowing F "FROM 200"). If first liner 52 is flowing over heat roll 212, first liner 52 is heated to a temperature in a range from about 185 degrees Fahrenheit to about 205 degrees Fahrenheit (as shown in FIG. 6; 52 flowing F "FROM 200"). If second liner 54 is flowing F over heat roll 212, second liner 54 is heated to a temperature up to but not exceeding about 130 degrees Fahrenheit (as shown in FIG. 8; 54 flowing F "FROM 200").

Web 50 exits and leaves heat roll 212 passing along, over and around various idle rollers, shown as 204, 206 towards drive roller 216. Drive roller 216 is preferably a suction roller as known and understood in the art. Suction roller 216 has a perforated outer surface to create a linear tension on web 50 as it travels downstream. A zero contact drive roller 218 is positioned between idle rollers 208 and 210. Zero contact roll 218 can be a stationary roller that does not rotate as the web of material traverses its circumferential surface. Instead, a volumetric flow rate of air at a controlled pressure is pumped from within the zero contact roll 218 radially outward through small openings or holes provided periodically and uniformly over and through the outer circumferential wall of the zero contact roll 218. The passing web of medium material 50 is supported by the circumferential outer surface of the zero contact roll 218 by a cushion of air.

In operation, and with primary reference to FIG. 6, the flowing material 50 flows along the sheet material pathway in the direction of arrow F. Material 50 flows around the outer surface of corrugating roller 302. Material 50 flows through nip 312 where it begins to be corrugated. The complimentary peaks of teeth 310 on roller 302 and valleys of teeth 310 of roller 304 interlock to sandwich material 50 therebetween. The interlocking teeth form the sinusoidal shape of material 50. Material 50 continues to move downstream towards the adhesive application roller 306.

Adhesive application roller 306 rotates about its axis into a pool 318 of adhesive 319. The pool is in contact with outer surface of roller 306. As roller 306 rotates, adhesive is metered (metered adhesive 322) by metering rod 320 onto the outer surface of roll 306. Metered adhesive 322 is a precise amount and can specifically vary depending on each desired application by adjusting rod 320 relative to surface of roll 306. The amount of metered adhesive 322 determines the thickness or amount of adhesive bead 314 applied to the flute tip of corrugated sheet 50.

Corrugated sheet 50 having bead of adhesive 314 moves towards roll 308. Roll 308 receives a first liner 52 from a feed source or from heating device 200. Material 52 flowing around roll 308 contacts material 50 under pressure. Material 50 adheres to the flat or planar liner 52. The pressure may be applied via a pressure exerting device or roll 308 within the paperboard facing machine 300 to exert a pressure on the web of medium material flowing downstream F as the web 50 is adhered to the liner 52. The pressure exerted within facing machine 300 by pressure exerting device or roll 308 on the flowing web of medium material 50 and first liner 52 is from about 65 bar to about 85 bar. Preferably, the pressure is about 75 bar.

In operation and with primary reference to FIG. 7, corrugated medium 50 adhered to first liner 52 flows F from single facing machine 300 to double backer 500 along the sheet material pathway. When medium 50 is adhered to liner 52 it is known as a Single Face. Single Face flows around roller 404 towards roller 406 where adhesive 414 may be applied to create a bead 416 on the corrugated flute of medium 50. Adhesive roller 402 rotates in the direction flow stream F through an adhesive source 412. Adhesive source 412 includes starch and water, as well as other additives and modifiers as understood in the art.

In operation and with primary reference to FIG. 8, Single Face flows FROM 400 (adhesive applicator 400) having first liner adhered to corrugated medium 50 and having a bead of adhesive 416 deposited on the flutes opposing liner. Single Face flows towards toward the gap defined by first and second rollers 502, 504. Second liner 54 flows FROM 200 (heating apparatus 200) and also flows toward the gap defined by first and second rollers 502, 504. Single Face (medium 50 adhered to liner 52) meet and connect to second liner 54 in the gap defined by rollers 502, 504. Rollers 502, 504 apply pressure and effectively pinch together second liner 54 to the flutes of medium 50 at bead 416. Bead of adhesive 416 adheres second liner 54 to medium 50 creating a "double-backed" sheet of paperboard. The term double-backed refers to a sheet of manufactured paperboard 60 having two liners 52, 54 sandwiching a sinusoidally shaped medium material 50.

Formed paperboard 60 continues to flow F downstream. The upper portion of paperboard 60 (formerly first liner 52) contacts belt 518. Belt 518 is part of a drive system 510 configured to move paperboard 60 downstream. Drive system 510 may be powered via conventional manners as understood in the art of paperboard manufacturing. The lower portion of paperboard 60 (formerly second liner 54) flows downstream above hot plates 506.

Hot plates 506 are controlled by the steam pressure and temperature control system 508. Control system 508 controls the temperature of each plate 506a, 506b, 506c, 506d within the set of hot plates 506 through the use of pressurized steam from source 509, independent of the remaining hot plates within the set. The pressurized steam is contained within each plate to impart a temperature to the outer surface. The plates 506 may include at least four hot plates 506a, 506b, 506c, and 506d. The plates are arranged in a side-to-side manner from upstream to downstream. The plates vary in temperature from upstream to downstream. When viewed from the side (FIG. 8) the plate foremost upstream plate 506a is the coolest relative to the other plates. Looking at the downstream plates 506b, 506c, 506d, the temperature may stay equal to the prior plate, or the temperature may increase. The temperature of a plate is never less than the plate directly upstream from it. So by way of non-limiting example, for a Single Face sheet of material (medium 50 adhered to liner 52 without second liner 54) flowing F over plates 506 and if plate 506a is 320° F. (heated with 75 psi steam), then plate 506b (the plate directly downstream from plate 506a) must be at least the same temperature or hotter than 320° F. Stated otherwise, plate 506b cannot be cooler than 506a. If plate 506b is 328° F. (heated with 85 psi steam), then plate 506c (the plate directly downstream) cannot be cooler than 328° F. (it may be equal to 85 degrees). Thus, if plate 506c is also 328° F. (heated with 85 psi steam), then plate 506d (the plate directly downstream) cannot be cooler than 328° F. and is preferably about 330° F. Additionally, the set of hot plates 506 may be configured such that each hot plate 506a, 506b, 506c, 506d has a temperature not equal to any other plate in the set of hot plates 506.

Alternatively, by way of non-limiting example, for a double backed sheet of paperboard 60, the temperatures for the hot plates 506 may be slightly hotter than those described above for a Single Face. Thus, when a double backed sheet of paperboard 60 is formed by System 1000, when plate 506a is 330° F. (heated with 90 psi steam), then plate 506b (the plate directly downstream from plate 506a) must be at least the same temperature or hotter than 330° F. Stated otherwise, plate 506*b* cannot be cooler than 506*a*. If plate 506*b* is 338° F. (heated with 100 psi steam), then plate 506*c* (the plate directly downstream) cannot be cooler than 338° F. (it may be equal to 338 degrees). Thus, if plate 506*c* is also 344° F. (heated with 110 psi steam), then plate 506*d* (the plate directly downstream) cannot be cooler than 344° F. and could be about 355° F. (heated with 130 psi steam). The hot plates 506 for a double backed paperboard are all preferably less than or equal to 350° F. (heated with 120 psi steam)

Figure 9:
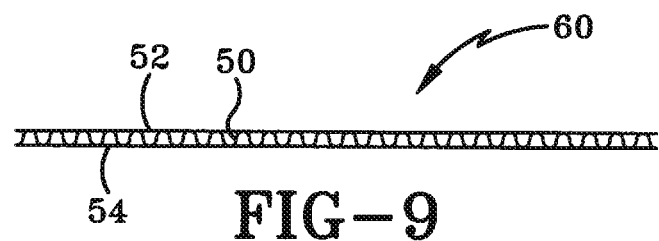
FIG. 9 is a side view of a sheet of paperboard manufactured by the method and system of the present invention.

Hot plates 506 cool paperboard 60 flowing atop to cure the adhesive applied in single facer 300, and applied in adhesive applicator 400. The configuration of hot plates 506 ensure paperboard 60 should not warp while uniformly drying (FIG. 9). Further, this configuration should produce even adhesive lines to prevent delamination (FIG. 10).

In operation and with primary reference to FIG. 11, adhesive composition 319 stored in adhesive source 318 (FIG. 6) is manufactured by the shown steps. By way of non-limiting example, two Formulas: Formula 3 Single Face (SF) and Formula 4 Double Back (DB), are provided with reference to the method of manufacturing adhesive 319. In the manufacture of adhesive 319, first a user should provide an amount of water 1102 contained within a source container. For each of Formula 3 and Formula 4, 110 gallons of water 1102 having a weight of 916 lbs is provided. Then water 1102 should be heated 1115 to a first temperature 1125. The first temperature 1125 is less than 120° F. and preferably in a range from about 105° F. to about 115° F. As shown in FIG. 11, the first temperature 1125 of Formula 3 is 112° F. and of Formula 4 is 111° F.

Then, a rheology modifier 1104 is added to the heated water 1102 to create a heated solution. For each of Formula 3 and Formula 4, 46 pounds of additive or modifier 1104 is added. Next, starch or pearl starch 1106 is added to the heated solution. For Formula 3, 107 pounds of starch 1106 is added, and for Formula 4, 91 pounds of starch 1106 is added. Also, caustic 1108 is added to heated solution. For formula 3, 23.5 pounds of caustic 1108 is added, and for Formula 4, 29.3 pounds of caustic 1108 is added. Then, the heated solution is mixed for a first period of time 1101 to create a heated mixture. As shown in FIG. 11, the first time period 1101 is about 3 minutes for each of Formula 3 and Formula 4. The rheology modifier 1104 is from about 2.5% to about 6% solids by weight (% wt. solids) of the heated solution. As shown, modifier 1104 is 4.2% wt. solids for Formula 3 (46 pounds/1093 pounds=4.2%) The starch 1106 is from about 7.5% wt. solids to about 12% wt. solids of the heated solution. As shown, starch 1106 is 9.7% wt. solids for Formula 3 (107 pounds/1093 pounds=9.7%). Caustic 1108 is from about 1% wt. solids to about 4% wt. solids. As shown in Formula 3, caustic 1108 is 2.15% wt. solids (23.5 pounds/1093 pounds=2.15%)

After the heated solution is mixed, then primary borax or borate 1106 is added to the heated mixture. Four pounds of borate 1106 is added for Formula 3, and for Formula 4, 7 pounds of borate 1106 is added. Then, the heated mixture is mixed for a second period of time 1103. Preferably, the second time period 1103 is about 2 minutes. The borate is from about 0.1% wt. solids to about 1% wt. solids of the heated mixture. As shown, borate 1110 is 0.3% wt. solids of the heated mixture (4 pounds/1097 pounds=0.3% wt. solids)

After, mixing the heated mixture for a second time period 1103, a second amount of water 1111 is added. For Formula 3, 158 gallons are added and for Formula 4, 160 gallons are added. The second amount of water 111 is 135% to about 150% the first amount of water (158 gallons/110 gallons=144%). The heated mixture is then re-heated 1113 to a second temperature 1127, wherein the second temperature 1127 is a range from about 90° F. to about 100° F. For each of Formula 3 and Formula 4, second temperature 1127 is 94° F. Then, the heated mixture is flushed with an amount of flush water 1118. Flush water 1118 refers to an amount of water added after the second reheating 1113. For each Formula 3 and Formula 4, 25 gallons of flush water 1118 are added to the heated mixture. Flush water 1118 does not leave the heated mixture, the term "flush" refers to water added to the heated mixture after the second reheating 1113. The amount of flush water 1118 is from about 14% to about 18% the second amount of water, as shown 25 gallons/158 gallons=15.8%.

A secondary borate or secondary borax 1120 is then added. For Formula 3, 2.5 pounds of secondary borax 1120 are added, and for Formula 4, 7 pounds of secondary borax 1120 are added. The second borax 1120 is from about 50% to about 100% of the amount of first borax 1110. For example, in Formula 3 2.5 pounds of secondary borax is 62.5% of the amount of primary borax. (2.5 pounds/4 pounds=62.5%) And, for Formula 4, secondary borax is 100% of the amount of primary borax. (7 pounds/7 pounds=100%)

After secondary borax 1120, a second starch 1122 is added. For Formula 3, 520 pounds of second starch 1122 is added, and for Formula 4, 581 pounds of second starch 1122 is added. Second starch 1122 is an amount that is from about 450% to about 650% the amount of pearl starch 1106. For example, in formula 3 second starch 1122 is 485% the amount of primary starch 1106 (520 pounds/107 pounds=485%). In Formula 4, the second starch is 638% the amount of primary starch 1106 (581 pounds/91 pounds=638%). The heated mixture is then mixed for a third period of time 1105. Preferably, the third period of time 1105 is one minute.

After the step of mixing the heated mixture for a third period of time 1105, the biocide 1112 is added to the heated mixture. For Formulas 3 and 4, 3 pounds of biocide 1112 are added. 3 pounds of biocide 1112 is about 0.1% solids by weight (% wt. solids) of the entire adhesive compound. The defoamer 1114 is added to the heated mixture in a 3 ounce amount to each of Formula 3 and 4. The mass amount of defoamer 1114 (3 ounces) is 6.25% of the mass amount of biocide 1112 (3 pounds or 48 ounces). The penetrating agent 1116 is then added to the heated mixture. Preferably, about 17 ounces of penetrating agent 1116 is added. The mass amount of penetrating agent 1116 (17 ounces) is about 35.4% of the mass amount of biocide 1112 (48 ounces). Then, the heated mixture is mixed for a fourth period of time 1107. Preferably, the fourth period 1107 of time is one minute.

Subsequent to the step of mixing the heated mixture for a fourth period of time 1107, the heated mixture is mixed for a fifth period 1109 of time, wherein the fifth period 1109 of time is 2 minutes, to create the adhesive compound. In the preferred method embodiment, time periods 1101, 1103, 1105, 1107, 1109 are separate and distinct (i.e., non-continuous) from one another. The term "time periods" refers to the time in which a mixing device (not shown) is actually moving within a source container to mix the contents together. The breaks in time between operating the mixing device, so that the adhesive 319 components may be added to the container, create and define the separate and distinct time periods 1101, 1103, 1105, 1107, 1109. By way of non-limiting example, when the mixing device is not operating (i.e., turned off momentarily) after third time period 1105, the biocide, the defoamer, and the penetrating agent may be added, and thus creating a non-continuous time segment.

The method for manufacturing adhesive 319 detailed in FIG. 11 results in producing an adhesive having desirable quality specifications. Namely, a desired starch gel temperature, a desired viscosity, and a desired amount of solids by weight (% wt. solids). By way of not limiting example, a desirable quality specification starch gel temperature for Formula 3 is 143° F.-145° F. and for Formula 4 139° F.-141° F. A desirably viscosity amount of adhesive 319 for both Formula 3 and Formula is 23+/−3 Love Cup. A desirable % wt. solids for Formula 3 is 21.7% and for Formula 4 is 22.8%.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the invention are an example and the invention is not limited to the exact details shown or described.

The invention claimed is:

1. A method of manufacturing an adhesive compound, the method comprising the steps of:
    providing a first amount of water;
    heating the water to a first temperature;
    adding a rheology modifier to the heated water to create a heated solution, wherein the rheology modifier is a water-soluble polymer material;
    adding a first starch to the heated solution;
    adding a caustic to the heated solution;
    mixing the heated solution for a first period of time to create a heated mixture;
    adding a first borate to the heated mixture; and
    mixing the heated mixture for a second period of time;
    adding a second amount of water to the heated mixture, the second amount of water is from about 135% to about 150% of the first amount of water;
    re-heating the heated mixture to a second temperature, wherein the second temperature is a range from about 90° F. to about 100° F.;
    flushing the heated mixture with an amount of flush water, the amount of flush water is from about 14% to about 18% of the second amount of water;
    adding a second borate, the second borate is from about 50% to about 100% of the amount of the first borate;
    adding a second starch, the second starch is from about 450% to about 650% of the amount of the first starch; and
    mixing the heated mixture for a third period of time.

2. The method of claim 1, wherein the rheology modifier is from about 2.5 to about 6% solids by weight (% wt. solids) of the heated solution.

3. The method of claim 1, wherein the first starch is from about 7.5 to about 12% wt. solids of the heated solution.

4. The method of claim 1, wherein the caustic is from about 1 to about 4% wt. solids of the heated solution.

5. The method of claim 1, wherein the first borate is from about 0.1 to about 1% wt. solids of the heated mixture prior to mixing the heated mixture for the second period of time.

6. The method of claim 1, wherein the first time period is in a range from one minute to five minutes; and wherein the first temperature is less than 120° F.

7. The method of claim 1, wherein the first temperature is less than 120° F.

8. The method of claim 7, wherein the first temperature is in a range from about 105° F. to about 115° F.

9. The method of claim 1, wherein the rheology modifier is from about 2.5 to about 6% solids by weight (% wt. solids) of the heated solution;
    wherein the starch is from about 7.5 to about 12% wt. solids of the heated solution;
    wherein the caustic is from about 1 to about 4% wt. solids of the heated solution;
    wherein the first borate is from about 0.1 to about 1% wt. solids of the heated mixture prior to mixing the heated mixture for the second period of time;
    wherein the first time period is in a range from one minute to five minutes; and
    wherein the first temperature is less than 120° F.

10. The method of claim 9, wherein the second time period is from about 1 minute to about 3 minutes.

11. The method of claim 1, wherein the third period of time is from about 0.5 minute to about 2 minutes.

12. The method of claim 1, subsequent to the step of mixing the heated mixture for a third period of time, further comprising the steps of:
    adding a biocide to the heated mixture;
    adding a defoamer to the heated mixture;
    adding a penetrating agent to the heated mixture; and
    mixing the heated mixture for a fourth period of time.

13. The method of claim 12, wherein the amount of biocide is from about 0.005% to about 0.25% solids by weight of the heated mixture.

14. The method of claim 12, wherein the biocide has a mass and the defoamer has a mass which is from about 5% to about 10% of the biocide mass.

15. The method of claim 12, wherein the biocide has a mass and the penetrating agent has a mass which is from about 25% to about 45% of the biocide mass.

16. The method of claim 12, wherein the fourth period of time is from about 0.5 minute to about 2 minutes.

17. The method of claim 12, subsequent to the step of mixing the heated mixture for a fourth period of time, further comprising the steps of:
    mixing the heated mixture for a fifth period of time, wherein the fifth period of time is from about 1 minute to about 3 minutes, to create the adhesive compound.

18. A method of manufacturing an adhesive compound, the method comprising the steps of:
    providing an amount of water contained within a source container;
    heating the water to a first temperature;
    adding a rheology modifier to the heated water to create a heated solution;
    adding a starch to the heated solution;
    mixing the heated solution for a first period of time to create a heated mixture;
    adding a first borate to the heated mixture;
    adding a biocide to the heated mixture;
    adding a defoamer to the heated mixture;
    adding a penetrating agent to the heated mixture; and
    mixing the heated mixture for a second period of time to create the adhesive compound;
    adding a second amount of water to the heated mixture, the second amount of water is from about 135% to about 150% of the first amount of water;
    re-heating the heated mixture to a second temperature, wherein the second temperature is a range from about 90° F. to about 100° F.;

flushing the heating mixture with an amount of flush water, wherein the amount of flush water is from about 14% to about 18% of the second amount of water;

adding a second borate, the second borate is from about 50% to about 100% of the amount of the first borate;

adding a second starch, wherein the second starch is from about 450% to about 650% of the amount of the first starch; and mixing the heated mixture for a third period of time.

* * * * *